United States Patent [19]
Matsuda

[11] Patent Number: 5,825,981
[45] Date of Patent: Oct. 20, 1998

[54] ROBOT SYSTEM AND ROBOT CONTROL DEVICE

[75] Inventor: Tomoo Matsuda, Fujisawa, Japan

[73] Assignee: Komatsu Ltd., Japan

[21] Appl. No.: 814,856

[22] Filed: Mar. 11, 1997

[30]   Foreign Application Priority Data

Mar. 11, 1996  [JP]  Japan .................................. 8-053138

[51] Int. Cl.[6] .............................. G06F 9/00; G06F 15/00; G06F 11/00
[52] U.S. Cl. .................................. 395/83; 395/93; 901/6; 901/46; 318/568.16
[58] Field of Search .......................... 395/83, 93; 901/6, 901/46; 318/568.16

[56]   References Cited

U.S. PATENT DOCUMENTS

| | | | |
|---|---|---|---|
| 4,633,385 | 12/1986 | Murata et al. | 901/6 |
| 4,639,878 | 1/1987 | Day et al. | 901/47 |
| 5,515,503 | 5/1996 | Simomura et al. | 395/902 |

Primary Examiner—George B. Davis
Attorney, Agent, or Firm—Baker & Daniels

[57]   ABSTRACT

An object of the device according to the present invention is to enable small-volume, high-diversity production to be conducted efficiently, in the same way as in the conventional FMS, whilst at the same time overcoming problems associated with the conventional techniques, such as the complexity of creating programs for manufacturing processes, work interruptions due to robot breakdown, and 'deadlock' incidents arising during operation. When seed data indicating an objective task (for example, the task of completing a particular product) is input to a computer, by communicating with hardware robots via a communications network, the computer selects a plurality of hardware robots, which are capable of implementing cooperatively the objective task indicated by the input seed data, and which are not engaged in any task based on other seed data. A software robot is created by inputting the seed data to at least one of the selected plurality of hardware robots. When the plurality of robots have been operated by means of the generated software robot and have completed the objective task, the seed data is withdrawn from the hardware robot(s) to which it was input.

4 Claims, 7 Drawing Sheets

ROBOT SYSTEM AND ROBOT CONTROL DEVICE

BACKGROUND OF THE INVENTION

1. Field of the Invention

The present invention relates to a robot system for carrying out prescribed tasks by means of robots, and to the structure of these robots, and in particular, it relates to a robot system and robot control device for same whereby mobile robots, such as unmanned conveyor vehicles, or the like, and stationary robots, such as industrial robots, three-dimensional unmanned warehouses, or the like, which are connected to a wired or wireless information communication network, carry out particular work processes in mutual cooperation, on the basis of information transmitted via the network.

2. Description of the Related Art

In the prior art, 'flexible manufacturing systems' (FMS) are widely known, whereby small-volume, high-diversity production involving small product numbers per production batch is possible by means of connecting, within a factory, unmanned conveyor vehicles which convey half-finished products, or the like, autonomously, and industrial robots or unmanned warehouses which repeat particular work operations, to a communications network, and issuing instructions to the unmanned conveyor vehicles, and the like, via this network by means of a computer assigned to process management, such that these unmanned conveyor vehicles and the like operate in mutual synchronization.

However, with FMS set-ups, in cases where each lot involves selective production of a single item only, the total production number will be the same as the number of lots. Therefore, the amount of program data which must be preset into the computer assigned to process management, in other words, procedural data for process changes, will be enormous (a huge number of permutations and combinations).

Furthermore, in conventional FMS set-ups, it has been necessary for human operators to determine this huge number of permutations and combinations in advance, and program these into the computer. This means that if one of a plurality of unmanned conveyor vehicles breaks down during production, or if one of a plurality of industrial robots breaks down, it will become impossible to operate the mechanical equipment in sequence as predetermined by the program. Therefore, in some cases, all processes will come to a halt.

Moreover, in recent years, due to the reduction in product numbers per lot, to a level of one or several products per lot, instead of constructing conveyor-type assembly lines which use only automatic machines, as in conventional systems, there has been a shift towards cell production systems whereby production is conducted by means of cells arranged in parallel, wherein human operators carry out a plurality of processes manually.

In cell production systems, among the plurality of production processes entailed from manufacture through to inspection, there are processes which involve manual work by human operators, and this requires management to determine "When, and to which cell, half-finished products or materials should be conveyed." Since the production tasks involve manual input in this way, although on the one hand there may be frequent variations and irregularities, there is an advantage in that if one of the cells runs into difficulty, other cells can take on the work to maintain continuous production.

However, in order to exploit this feature of cell production systems, it is necessary for human operators to implement steps such as supplying components, or the like, as and when conditions demand, in response to the circumstances in the cell where the operator is working. This approach is not well suited to the FMS perspective where permutations and combinations of work procedures are programmed in advance, and therefore it has not been possible to implement cell production programs effectively in FMS set-ups.

On the other hand, one widely implemented method for managing traffic and controlling vehicle allocation with respect to unmanned conveyor vehicles in a factory involves providing a control computer, and controlling the unmanned conveyor vehicles by exchanging information between this control computer and the unmanned conveyor vehicles via lead wires or radio communication.

However, in this method, when the transport paths in the factory become complex as the unmanned conveyor vehicles exceed a certain number, there may be the occurrence of "deadlocking" in the lead wires or at points of intersection, where a plurality of unmanned conveyor vehicles interfere with each other's progress.

Therefore, conventionally, in order to prevent deadlocking incidents, it has not been possible to operate a large number of unmanned conveyor vehicles in a factory, which means that it has not been possible to raise productivity.

In recent years, many different multiple-robot control systems have been proposed, which allow a plurality of mobile robots to work together in cooperation, by communicating with each other and "negotiating", although these proposals have been at the level of academic research reports.

One of these proposals involves an approach whereby "the individual robots are autonomous, and can behave as they please."

However, if this type of approach is applied to a production system, not only will harmonious operation be difficult, but there is also the possibility that sharp declines in production efficiency may occur in the event of deadlock incidents in narrow areas.

There is also an approach according to which "an individual (robot) negotiates with other individuals by asserting that it must execute its own action."

However, even if this approach is applied, it can be predicted that the operating efficiency of the production system will decline, due to the individual robots refusing to give way to each other, or conversely, giving way to an excessive degree.

In yet a further approach, "a particular master robot has full control over other slave robots". This is known as a heterogeneous master-slave robot system, and involves setting functional priorities between individual robots in advance. In other words, the robot employed as the master is equipped internally with a computer of sufficiently high capacity, and the slave robots are operated by receiving instructions from the computer mounted in this master robot.

However, if this approach is used, it can be predicted that in the event of a breakdown in the master robot, the slave robots will also cease to function and operating efficiency will decline due to the interruption in production.

In this way, it can be seen that a variety of problems are generated by the perspectives described below.

Namely, since a conventional FMS approach focuses on running production equipment at high efficiency, the "active subjects" are the industrial robots and unmanned conveyor vehicles which represent the production equipment, and the items under manufacture are treated merely as "objects for handling" by the production equipment.

This type of perspective means intrinsically that, if the choice of specification for the items under manufacture diversifies, and the permutations and combinations for manufacturing procedures and changes in production programs become more complex and need to be modified according to circumstances, then programming will also become complex, leading to problems such as complication in preparatory tasks.

Furthermore, with conventional robots, be it industrial robots, unmanned conveyor vehicles, or even research-stage homogeneous robots (having no inherent functional priority, in other words, equal), each individual robot is ultimately treated as an active subject which is "a single independent individual".

This perspective means intrinsically that, if a plurality of robots are used simultaneously, then it is always necessary to provide cooperative operation and negotiation by communication between the individual robots. Consequently, the programming required for implementing this cooperative operation, and the like, requires difficult logic, such as the logic used in games, and involves complicated work, and even if, for example, this complex programming is carried out, it is still not possible by means of advance manual programming to respond sufficiently to previously unenvisaged combinations of environmental conditions or changes in processing steps. Moreover, if the cooperation and negotiation between a plurality of robots which are to work simultaneously does not function properly, then problems, such as deadlocking, which affect production efficiency will occur.

Additionally, the case of heterogeneous master-slave robots as described above is based on the concept that priorities are previously assigned to the functions between individual robots.

As mentioned above, this concept leads to problems in that if the master robot breaks down, the slave robots will not function either.

A concept which opposes the idea of robots as hardware, as described above, is the concept of the software robot, and much research has been conducted on the subject of software robots in recent years. Here, a "hardware robot" means a robot as an item of hardware which is operated autonomously using electronic/control technology, and a "software robot" (sometimes also called a "software agent") means a robot as an item of software, which can be transferred autonomously between computers in a computer network, and which is operated by rewriting, and referring to, data.

One example of conventional technology relating to software robots of this kind is can be found in "Software Agent" ("*Jinko chino gakkaishi*" ["*Journal of Artificial Intelligence Society*"] Vol.10 No.5/1995 9/T. Nishida/published by Artificial Intelligence Society).

However, references of this kind only disclose basic research into software robots, and do not refer to points concerning how software robots may be incorporated in a production system, the various problems which may arise on-site in a production system, or means for resolving such problems.

Consequently, in addition to seeking to raise work efficiency in high-diversity, small-volume production systems by controlling a plurality of hardware robots by means of software robots, it is also sought to enable systems to be operated stably even when breakdowns occur in individual hardware robots.

In the autonomous robots incorporated in a production system as described above, there are two types of robot: known as "non-representational" and "representational" robots, which are widely known in the field of robot research, and are already common knowledge to operators in this sector. A representational autonomous robot is a robot which reacts to the outside world on the basis of the state of the outside world as represented by symbols.

A representational autonomous robot judges changes in the outside world by means of sensors, and these changes are converted, for example, to an electrical signal, and are supplied as a direct output to a discriminating section. At the discriminating section, the direct output value is compared to a reference value, and a symbol corresponding to one of a plurality of choices representing concepts (for example, in the case of identifying a color, the choices are the concepts of "red", "green", "yellow", "clear", or the like) is selected (for example, "red".) The direct output (electrical signal) from the sensor is converted to a symbol (concept) by the discriminating section in this way because the amount of information in the direct output from the sensor is large compared to the symbol output from the discriminating section, and although it reflects very slight changes in the outside world, the detailed information contained in the direct output is not necessarily valuable information.

If the outside world can be represented by appropriate symbols in this way, then it is possible to gain a deeper appreciation of the outside world by reasoning from these symbols. For example, if the robot knows that "I am now looking at an apple", then if its sensors detect that "the color is red" as described above, it will be able to infer that "The color of the apple I am now looking at is red." By incorporating further representations in the form of symbols, it is possible for the robot to react satisfactorily on the basis of the state of the outside world as represented by symbols. In other words, a representational autonomous robot has the advantage that it is capable of advanced reasoning using extensive, complex intelligence represented by symbols.

However, there are drawbacks in that if a representational autonomous robot encounters circumstances in the outside world which it cannot represent by choosing a predetermined concept, then it will not be able to apply appropriate reasoning, and depending on the situation, it may cease operation. For example, if the choices available to a robot which is travelling outdoors do not include the choice "hole", then the robot will not be capable of taking action to get past a "hole" of this kind, by riding over it, for instance, and it will stop at that position.

Furthermore, since the symbol taken as the result does not always match the reality of the outside world, there are also problems in that the robot may not be able to respond accurately to the outside world as it actually exists.

Specifically, using the aforementioned example, the symbol "red" does not necessarily give a satisfactory depiction of the subtle color tones of an apple in the outside world. This is because representations based on symbols simply involve applying a concept choice according to a signal output by sensors in response to the appearance of the outside world, but they do not represent the outside world as it is. In other words, the object that actually exists in the outside world may be an object other than an apple which may appear to be "yellow" or "green" depending on the angle of observation and the ambient light. In this way, if the robot believes that the result "red" it happens to detect at that time relates to the actual object, then it may be misled by a symbol which is merely created by a representational view, and therefore it cannot respond accurately to the outside world as it really is.

On the other hand, a non-representational autonomous robot differs from a representational robot in that it is not restricted to a particular range of choices, but rather it reacts immediately to the outside world on the basis of direct outputs from sensors.

Since a non-representational autonomous robot of this kind does not restrict the conditions in the outside world to a particular range of choices in advance, it has advantages in that even if unforeseen circumstances beyond the range of choices (in the aforementioned example, the existence of a "hole") arise in the outside world, it is capable of responding immediately to the outside world (it can ride over the "hole", or the like.)

However, a non-representational autonomous robot can only respond immediately and it entails problems in that it will not always respond appropriately to the outside world (since it has no conception of the word "hole", it may fall down the "hole",) and it is not capable of responding appropriately to circumstances in the outside world by means of advanced reasoning using extensive past knowledge.

Above all, with robots such as unmanned conveyor vehicles or construction machines, even if the robots receive external instructions, it is necessary for them to take action which responds appropriately to environmental changes by using existing information. Consequently, in addition to reasoning based on symbols, it is necessary that the robots can respond appropriately to unexpected conditions, such as accidents or breakdowns. In other words, there is demand for robots to be developed, which offset the drawbacks of conventional representational and non-representational robots, whilst combining the advantages thereof.

Specifically, there is demand for commercial supply of a robot control device which enables robots to respond appropriately to the outside world by means of reasoning based on symbols, even if they encounter unforeseen circumstances.

SUMMARY OF THE INVENTION

A first object of the present invention is to achieve increased work efficiency in a high-diversity, small-volume production system, by controlling a plurality of hardware robots by means of a software robot, and to enable the system to be operated stably even when breakdowns occur in individual hardware robots.

A second object of the present invention is to provide commercially a robot control device which enables robots to respond appropriately to the outside world by means of reasoning based on symbols, even if they encounter unforeseen circumstances.

In order to achieve the first object, in a first invention which is the principal invention of the present invention, it is provided a robot system for carrying out a prescribed task by operating a plurality of hardware robots, comprising: a computer into which seed data indicating an objective task is input; a software robot, whereby the plurality of hardware robots are operated in accordance with the objective task, by means of inputting the seed data to at least one hardware robot; and a communications network whereby the computer and the plurality of hardware robots are connected such that communication is possible therebetween; and by communicating with the hardware robots via the communications network, the computer comprises: selecting means for selecting a plurality of hardware robots which are capable of implementing cooperatively the objective task indicated by the input seed data and which are not engaged in any task based on other seed data; software robot generating means for creating a software robot comprising the selected plurality of hardware robots, by inputting the seed data to at least one hardware robot of the selected plurality of hardware robots; and withdrawing means for withdrawing the seed data from the hardware robot(s) to which the seed data has been input, when the plurality of hardware robots have been operated by the generated software robot and have completed the objective task.

Here, "hardware robot" is used in the sense of a computer-controlled machine, and is to be interpreted more widely than the term "robot" used commonly in the prior art. Specifically, in addition to mobile unmanned conveyor vehicles, security robots, cleaning robots, and the like, it includes automatic machines which involve movement in a broad sense, such as various transporting devices, for example, monorails and elevators. Moreover, with regard to fixed machines, in addition to devices which have a mechanical or chemical action, such as industrial robots, unmanned warehouses, automated production equipment, and the like, it also includes computer-controlled lighting, automatic doors, communications devices, and terminals for man—machine interfacing. Of course, the computer itself, which functions from a position fixed to the floor, is also treated as a hardware robot in the broad sense of the term.

It is an object of the present invention to achieve high efficiency in high-diversity, small-volume production and stable operation of equipment, by means of temporarily controlling a plurality of hardware robots connected to a communications network by means of a single software robot, according to circumstances, and devising the plurality of hardware robots such that are controlled by the single software robot as if they were "limbs" thereof.

The present invention was devised from a concept whereby, unlike a conventional FMS approach, the items under manufacture are designated as the "subject", and hardware robots acting as production equipment are operated in response to circumstances in the production processes for these items under manufacture.

Specifically, according to the present invention, when seed data indicating an objective task (for example, the task of completing a prescribed product,) is input to the computer, the computer, by means of communicating with the hardware robots via the communications network, selects a plurality of hardware robots which are capable of implementing cooperatively the objective task indicated by the input seed data, and which are not engaged in any task based on other seed data. Thereupon, the seed data is input to at least one of the selected plurality of hardware robots, whereby a software robot is created.

Furthermore, when the plurality of hardware robots have been operated by the generated software robot and have completed the objective task, the seed data is withdrawn from the hardware robot(s) to which it was input.

In this way, when the seed data is input, a plurality of hardware robots which are capable of implementing the task in question are selected from the hardware robots connected to the communications network, in accordance with the task details indicated by the seed data, and until the objective task is completed, in other words, temporarily, these hardware robots are placed under the control of a common software robot, which uses them as its "limbs". Namely, each individual hardware robot is regarded not as an independent active subject, but rather as "merely a component, such as a limb."

FIG. 10 depicts an image of a hardware robot group which is controlled by a common software robot to form a virtual entity.

As shown in FIG. 10, this image involves: a hardware robot i equipped with visual sensors, which acts as the "eyes" of the entity Im; hardware robots j equipped with arms, which act as the "arms" of the entity Im; a hardware robot k in the form of a floor-mounted unmanned warehouse, which acts as the "internal organs" of the entity Im; and hardware robots 1 in the form of fork-lift trucks, which act as the "legs" of the entity Im.

As described above, when a plurality of hardware robots suited to the objective task indicated by the seed data have been selected, caused to carry out the task, and have completed the objective task, the seed data is withdrawn from the hardware robots which have carried out the task thus far, and these hardware robots become available for tasks based on other seed data, thereby making it possible to achieve efficient small-volume, high-diversity production, simply by inputting a plurality of seed data (different specifications for items under manufacture). Moreover, in this case, the only task carried out by human operators is that of inputting the seed data relating to the objective (specification of final product), so it is not necessary to program in manufacturing procedures in advance to conform with the production equipment (hardware robots), as in conventional systems. As a result, it is possible to eliminate conventional problems such as complex programming and complicated preparatory tasks, in cases where there is a highly diverse choice of specifications for items under manufacture.

Furthermore, in cases where a plurality of hardware robots are operated and caused to carry out a task simultaneously, since the hardware robots are merely "limbs" of the software robot, it is not necessary to go to the trouble of conducting negotiations between hardware robots, as is the case conventionally. As a result, there is no need to carry out complex advance programming for the purpose of cooperative operation and negotiation by communication between the individual robots, as in conventional systems, and in addition, there is no occurrence of deadlock incidents when cooperation and negotiation between the plurality of robots breaks down, and so production efficiency is raised dramatically.

Furthermore, since a plurality of hardware robots are selected in response to the input of seed data, and hence there is no need for advance programming of hypothetical production procedures involving a plurality of hardware robots, then even if a hardware robot breaks down, for instance, it is possible for the task to be carried out by selecting an alternative hardware robot, thereby allowing situations where all processes are halted by the breakdown of a hardware robot to be prevented before they occur.

As described above, according to the first invention, remarkable merits are obtained in that, whilst allowing small-volume, high-diversity production to be carried out efficiently in the same way as in conventional FMS, all of the problems associated with conventional techniques are eliminated.

Furthermore, in order to achieve the second object described above, in a second invention of the present invention, it is provided a robot control device, which is provided with a sensor for detecting a state of an outside world, and symbol selecting means for inputting a detection value from the sensor and selecting, from a plurality of symbols, a symbol representing the state of the outside world in accordance with the sensor detection value, and which conducts reasoning based on the symbol selected by the symbol selecting means and operates an actuator based on a result of the reasoning, the robot control device comprising: sensor detection value inputting means for inputting the sensor detection value to the symbol selecting means when the sensor detection value has reached a certain reference value; first actuator operating means for taking the symbol selected by the symbol selecting means in accordance with the sensor detection value input by the sensor detection value inputting means and setting it as a first symbol candidate, and operating an actuator to verify that the first symbol candidate represents the state of the outside world; judging means for inputting the sensor detection value taken after the actuator has been operated by the first actuator operating means to the symbol selecting means, taking the symbol selected by the symbol selecting means in accordance with the input sensor detection value and setting it as a second symbol candidate, and judging whether the second symbol candidate matches with the first symbol candidate; and second actuator operating means which, when the judging means judges that the first symbol candidate and the second symbol candidate match, conducts reasoning based on the matched symbols, and operates the actuator based on the result of the reasoning.

In other words, according to this composition of the second invention, the direct output from the sensors is converted to a distinct symbol, and action is implemented on the basis of this distinct symbol, as in conventional representational autonomous robots, in addition to which a symbol obtained provisionally is set as a first candidate, this first candidate is then compared with a second candidate obtained after the actuator has been operated in order to verify this first candidate, and if the two candidates match, the symbol is finally selected, which means that a symbol which accurately indicates the state of the outside world is selected. Furthermore, since action is implemented on the basis of this accurate symbol, then it is possible to respond appropriately to the outside world by reasoning based on this appropriate symbol, even if unexpected situations are encountered. In other words, it has become possible to supply commercially robots which overcome the drawbacks of conventional representational and non-representational robots, but which combine the advantages of both.

DETAILED DESCRIPTION OF THE PREFERRED EMBODIMENTS

Below, a mode of implementing a robot system and a robot control device relating to the present invention are described with reference to the drawings.

Figure 1:
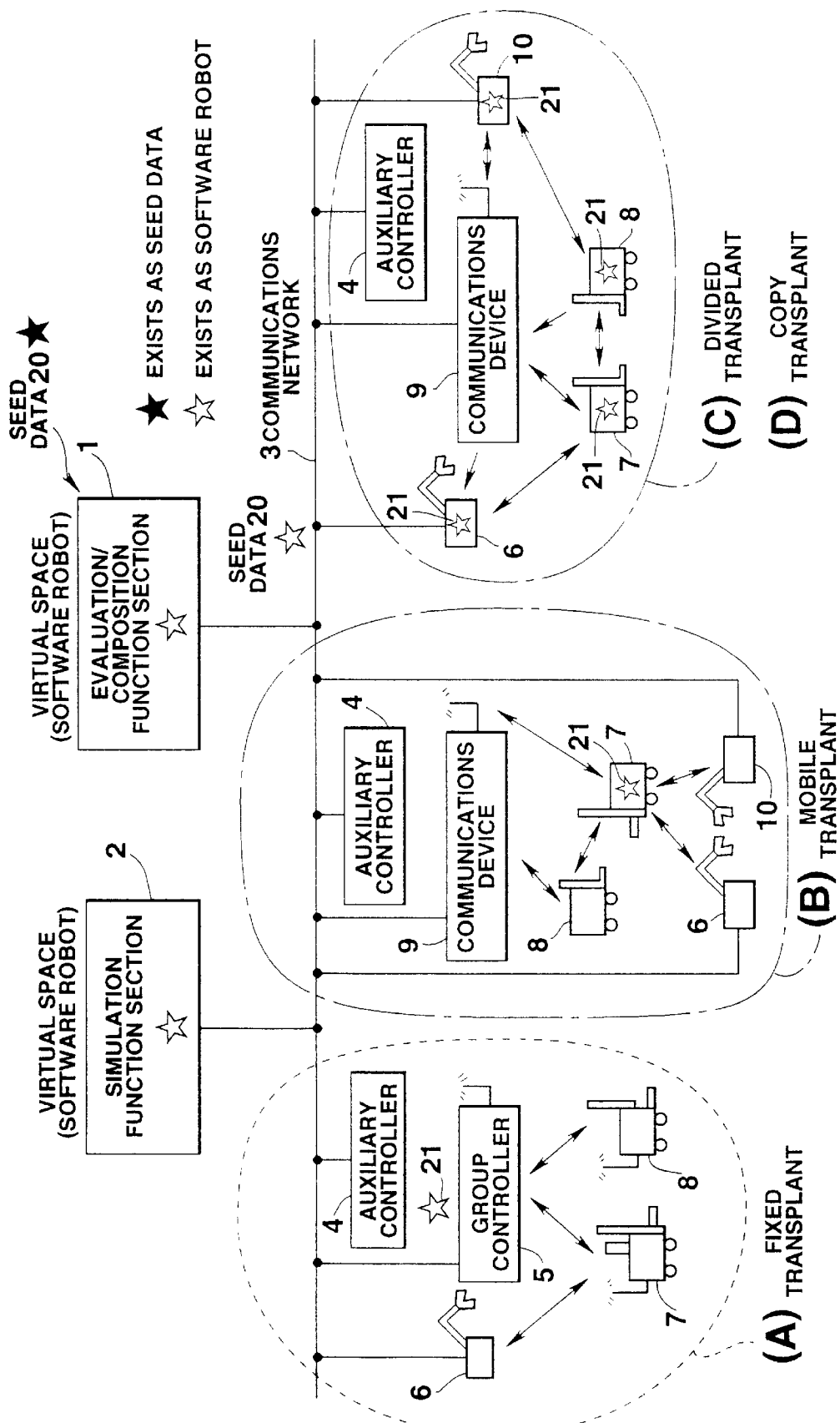
FIG. 1 is a diagram showing the composition of a mode for implementing a robot system relating to the present invention.

FIG. 1 gives a conceptual view of a robot system in the present mode for implementation, and it depicts a hypothetical robot system wherein a plurality of hardware robots are operated in order to carry out the tasks for producing an automobile, which is the final product.

Specifically, this system comprises: an evaluation and composition function section 1 which inputs, as seed data 20, data describing the specifications of the final product and conducts evaluation and composition processes, which are described below; a simulation function section 2 which implements simulations for the purpose of rewriting the contents of the seed data 20, as described below; software robots 21 which operate a plurality of hardware robots in accordance with individual objective tasks (tasks in each individual process) indicated by the seed data 20, by inputting the seed data 20 to at least one hardware robot; and a communications network 3 which connects the evaluation and composition function section 1, the simulation function section 2, and a plurality of hardware robots 4, 5, 6, . . . 10 . . ., such that communication is possible therebetween.

Here, the examples of hardware robots connected to the communications network 3 are: unmanned conveyor vehicles 7, 8; industrial robot arms 6, 10; a group controller 5; a communications device 9; and an auxiliary controller 4. Furthermore, the evaluation and composition function section 1 and the simulation function section 2 are constituted by floor-mounted computer devices.

The communications network 3 may be a radio or wired network.

When a software robot 21 is moved about this radio or wired communications network 3 by being transplanted or copied, the software robot 21 is in the form of seed data 20 (this is indicated by . By transplanting or copying this seed data 20 to a hardware robot via the communications network 3, it will then function as a software robot 21 (this is indicated by ).

Figure 9:
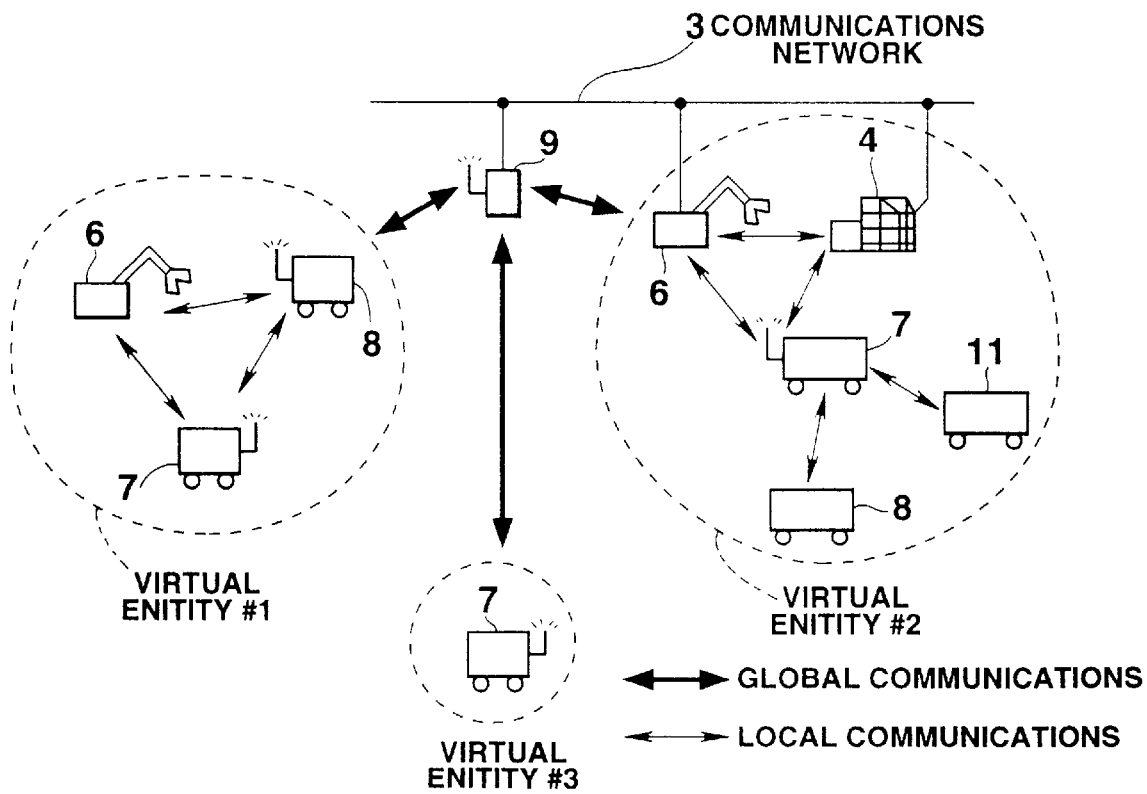
FIG. 9 is a diagram describing communication means in the robot system in FIG. 1.
Figure 10:
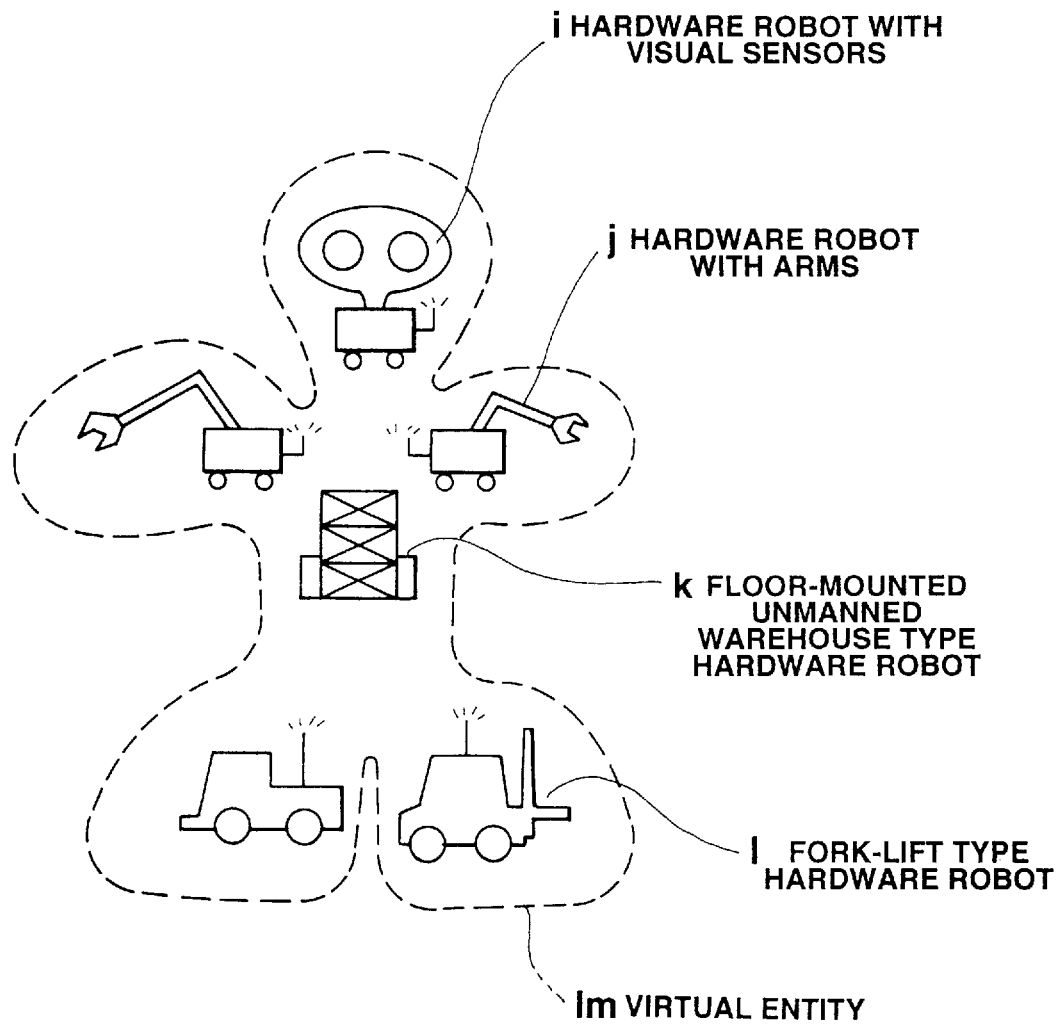
FIG. 10 is a diagram showing an image of a virtual entity composed by a plurality of heterogeneous robots (having inherently different functions).

Here, as shown in FIG. 9, there are two types of data communication conducted between the hardware robots: namely, global communication (marked by thick line) by "global communications means" capable of communicating across the whole communications network 3, and local communication (marked by thin line) by "local communications means" which are capable of communicating only when in a mutually connected state. Both of these communications means can be used simultaneously without mutual interference.

The "global communications means" is used when seed data 20 is transferred to the hardware robots. The "local communications means" are used for information exchange between a plurality of hardware robots controlled by a common software robot 21, in other words, within the virtual entities #1 and #2 in FIG. 9. Either the "global communications means" or the "local communications means" may be used for communicating the software robots 21, 21 which function by being transplanted or copied to the hardware robots.

In order to use a software robot 21 in a hardware robot in practical terms, it is necessary for the software robot 21 to be transplanted within the computer such that it functions in the form of software.

FIG. 1 shows modes (A), (B), (C), (D) for transplanting of a software robot 21.

Mode (A) is a "fixed transplant", and is a mode wherein a software robot 21 is transplanted specifically to a single fixed hardware robot 5 (group controller), which thereby controls the remaining hardware robots 6, 7, 8 inside the dotted line and uses them as "limbs" to conduct the objective task. Here, in specific terms, the single fixed hardware robot may be an actual computer connected to the communications network, or a communications device, industrial robot, production equipment, unmanned warehouse, control equipment for lighting device, control device for automatic doors, or the like, equipped with an internal computer.

Mode (B) is a "mobile transplant", and is a mode wherein a software robot 21 is transplanted specifically to a single mobile hardware robot 7 (unmanned conveyor vehicle), which thereby controls the remaining hardware robots 6, 8, 9, 10 inside the dotted line and uses them as "limbs" to conduct the objective task. Here, in specific terms, the mobile hardware robot may be a mobile inspection robot, assembly robot, unmanned conveyor vehicle, or a control device for transportation equipment, such as a conveyor, monorail, or the like.

Furthermore, mode (C) and mode (D) are respectively "divided transplants" and "copy transplants", wherein either a software robot 21 is divided by function and transplanted ("divided transplant") to a plurality of fixed or mobile hardware robots (6, 7, 8, 10), or the whole software robot 21 is copied ("copy transplant") to a plurality of fixed or mobile hardware robots (6, 7, 8, 10), and the hardware robots 6, 7, 8, 10 within the dotted line are used as "limbs" by the same software robot 21, and are caused to carry out the objective task. Here, "copy" means a state wherein the same software robot 21 is duplicated, and this duplicate is transplanted uniformly to all of the plurality of hardware robots 6, 7, 8, 10, such that they hold the same information.

Figure 3:
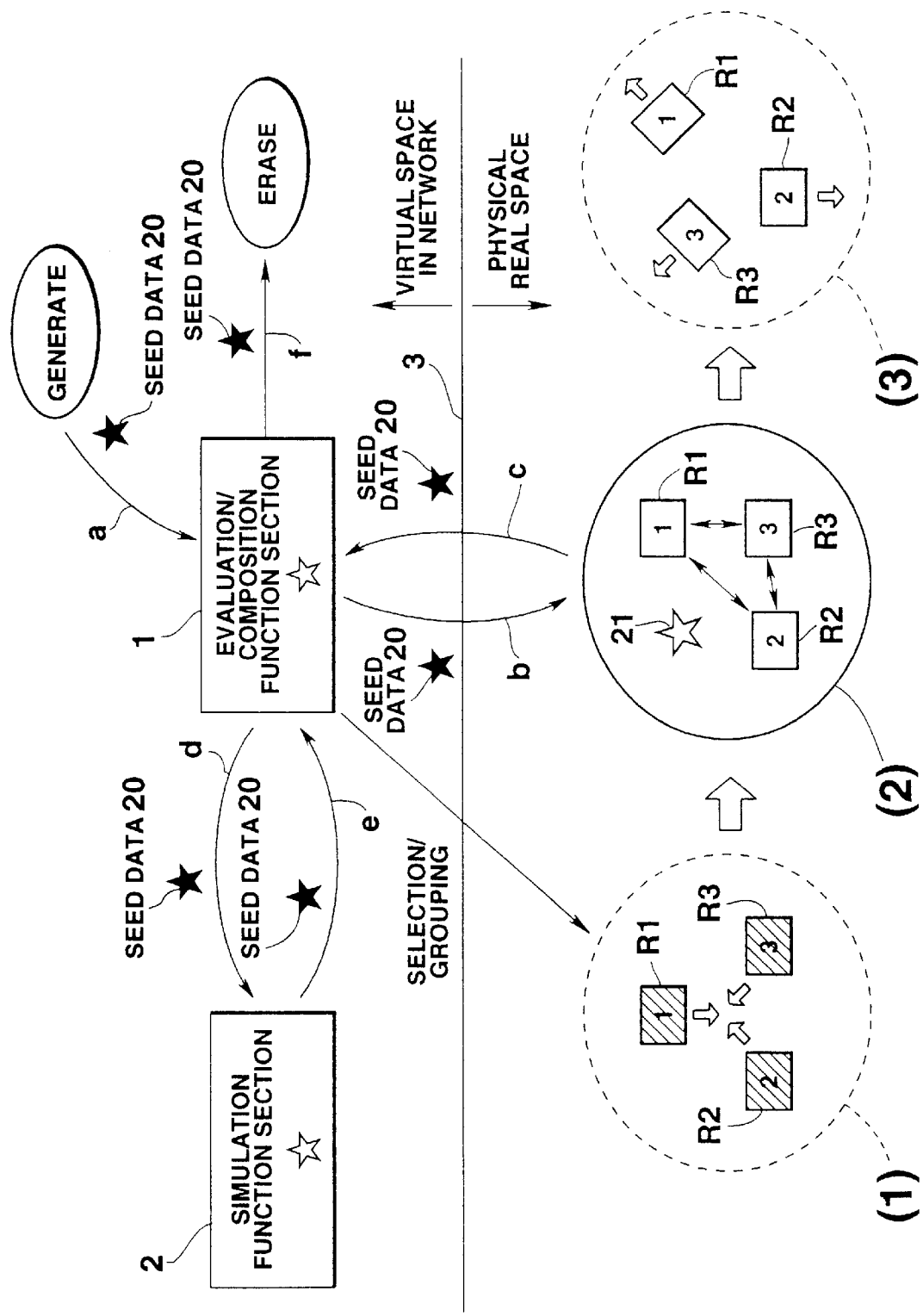
FIG. 3 is a diagram describing the movement of the seed data shown in FIG. 1.

As described above, a software robot 21 is transplanted to the hardware robots in various modes ("fixed transplant (A)", "mobile transplant (B)", "divided transplant (C)", "copy transplant (D)"), and when the software robot causes a plurality of hardware robots to undertake physical action, such as carrying out a task, this state is referred to as "the software robot acting in actual space" (see "actual space" in FIG. 3).

Whilst the seed data 20 can "act in actual space as a software robot 21", as described above, it is also possible for it to "act in virtual space (see virtual space in FIG. 3) as a software robot 21", using the simulation function of the simulation function section 2. As described below, whilst the seed data 20 functions by generating software robots 21 in actual space or virtual space, the contents of the seed data 20 itself can also be rewritten on the basis of the results of action carried out in the actual space or virtual space.

The evaluation and composition function section 1 evaluates the contents of externally input seed data 20, and determines whether it should be implemented in actual space or in virtual space, or alternatively, whether it should be deleted.

Next, the processing conducted in the evaluation and composition function section 1, which comprises a computer, is described with reference to the flow-chart in FIG. 2. Incidentally, FIG. 3 shows how the seed data 20 is transferred and this diagram is also referred to in the following description. In this mode for implementation, it is supposed that the evaluation and composition function section 1 is located at the business site of an automobile sales and repair operation, and the hardware robots connected to the communications network 3 are located in an automobile plant somewhere in the world.

Figure 2:
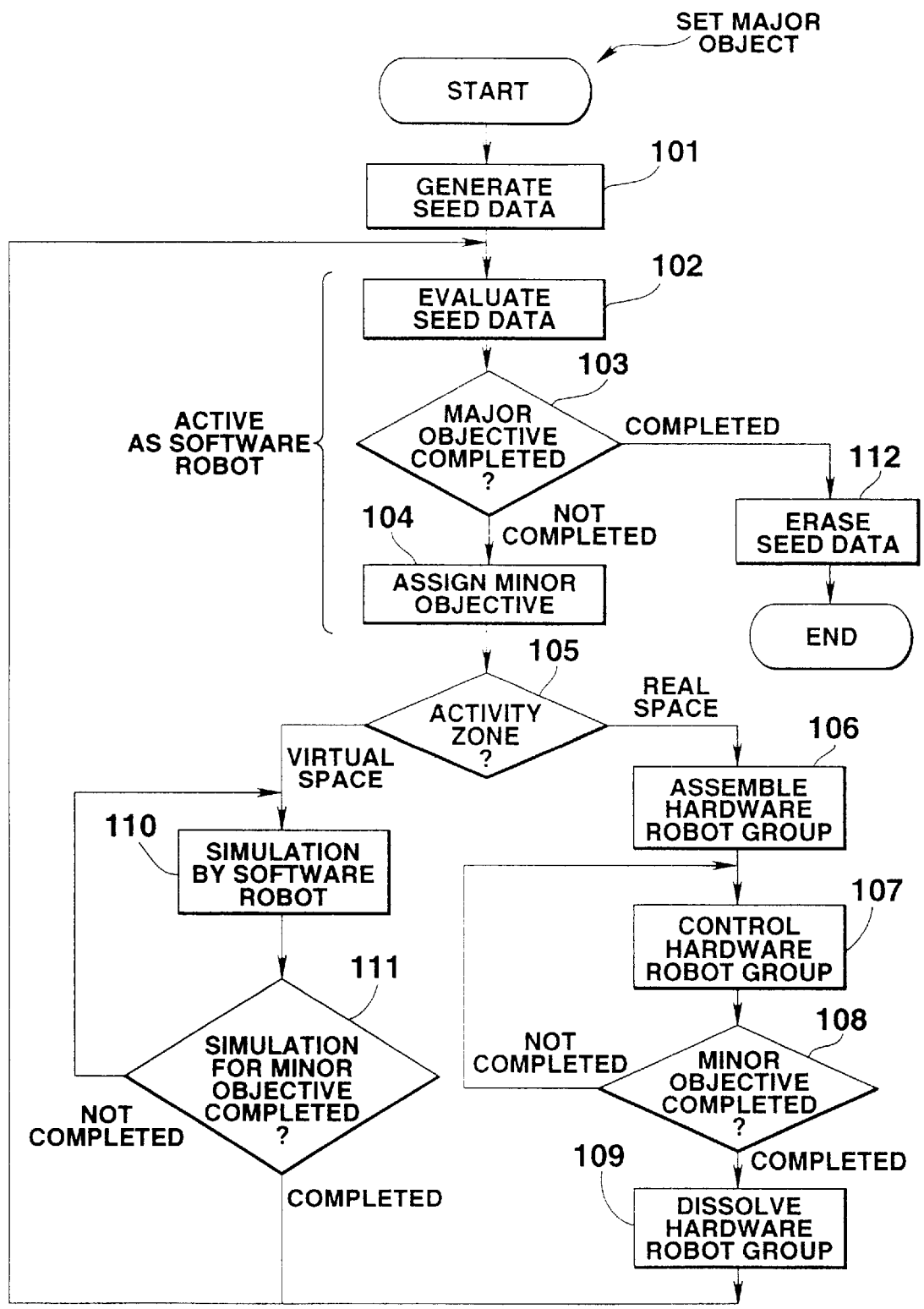
FIG. 2 is a flow-chart showing processing steps carried out in the evaluation/composition function section shown in FIG. 1.

As FIG. 2 shows, firstly, a production specification list indicating production specifications (type, model, color, equipment, etc.) for a single automobile which is to be completed by operating the hardware robots is input to the evaluation and composition function section as a major objective. Of course, a production command for a plurality of vehicles may also be input. By inputting data, which indicates the outline of the major objective of the tasks to be carried out using hardware robots, in the form of a production specification list in this way, seed data 20 is generated (see arrow a in FIG. 3). Here, FIGS. 4(*a*)–(*d*) shows how the contents of the seed data 20 change, and as shown in FIG. 4(*a*), the initial contents of the seed data 20 are simply the original data giving the specifications of the finished product, as described above (step 101).

Next, the seed data 20 is evaluated and it is determined whether or not the major objective (production of automobile) has been completed (step 102, 103). If the major objective has been completed, then the seed data 20 is erased since all of the tasks required therein have been fully carried out, (arrow f in FIG. 3: step 112), and the whole process terminates. However, even after the major objective has been completed, the seed data in question may be retained and used for subsequent quality control or maintenance processes.

If it is determined at step 103 that the major objective has not been completed, then the next minor objective to be undertaken is assigned.

Here, a 'minor objective' refers to a minimum processing step derived by subdividing each of the processes required to obtain the final product, such as pressing, painting, assembly, or the like. For example, the assembly process may be subdivided into a door installation process, window installation process, and the like. Data is then assigned for that minor objective, indicating task details, such as which tasks are to be carried out, using which equipment, and when, in that processing step. FIGS. 4(*b*), (*c*), (*d*) show how the task data "process 1", "process 2", . . . , is arranged successively in the seed data 20 (step 104).

When a minor objective is assigned in this way, in order to achieve that minor objective, it is determined by evaluating the current contents of the seed data 20 whether the software robot should be caused to act in virtual space or real space. Virtual space is designated in cases where tasks cannot be carried out using the task data currently contained in the seed data 20 in its present state, for instance, if the specifications for the production equipment have been changed to suit the hardware robots, and therefore it is necessary to rewrite the contents of the seed data 20 in accordance with the modified production equipment specifications.

On the other hand, real space is designated in cases where the task can be conducted using the task data contained in the current seed data 20 in its present state.

If real space is designated as the next activity zone, then by communicating with each of the hardware robots via the communications network 3, processing is implemented for selecting and assembling a plurality of hardware robots, which are capable of achieving cooperatively the current minor objective to be completed and which are not presently engaged in tasks based on other seed data 20'. As shown in FIG. 3(1), in this state, the hardware robots R1, R2, R3 are selected and assembled.

As described above, at the start of work for each minor objective, by communicating with each of the hardware robots via the communications network 3, a plurality of hardware robots are selected, which are capable of achieving cooperatively the current minor objective to be completed and which are not presently engaged in tasks based on other seed data 20', and therefore, at the start of work for each minor objective, it is possible to eliminate broken-down hardware robots from the selection. Consequently, even if a hardware robot which is to be involved in the next minor work objective suddenly breaks down whilst the production system is in operation, an alternative hardware robot can be selected from the plurality of hardware robots connected to the communications network 3, so there will be no interruption of the production work (step 106).

The plurality of hardware robots assembled in this way are able to communicate with each other via the "local communications means" described above. Therefore, if the seed data 20 is input to at least one of this plurality of hardware robots (see arrow b in FIG. 3), then a state is assumed whereby the plurality of hardware robots can be controlled via the local communications means, in accordance with the seed data 20. In other words, a software robot 21 is created (see state (2) in FIG. 3).

For example, in the case of a fixed transplant (A), a state is assumed whereby, of the selected plurality of hardware robots, seed data 20 is input to a single group controller 5 comprising a constituent part (see FIG. 5) wherein seed data 20 can be stored and caused to function as a software robot 21, and the software robot 21 is thereby transplanted specifically to the group controller 5 in question. By this means, the remaining hardware robots 6, 7, 8 within the dotted line (and of course the group controller 5 itself, also) are operated as "limbs" via the "local communications means" to accomplish the minor objective (for example, door installation task) (step 107).

When a plurality of hardware robots are operated by means of a software robot 21 in this way and the minor objective is completed (verdict at step 108: "completed"), the input seed data 20 is withdrawn from the hardware robot 5 to which it was input (see arrow c in FIG. 3). Specifically, once the software robot 21 has been deleted, only the seed data 20 that was rewritten during the task is returned to the evaluation and composition function section 1 via the communications network 3, as described below. At the same time, each of the hardware robots which have operated exactly like single constituent elements of an integral multi-robot system under the control of a common software robot 21, are released from their existing obligations and assume a state wherein they can be controlled once more by a new software robot 21' (see state (3) in FIG. 3). When hardware robots come under the control of a new software robot 21' at a subsequent step, they are operated in a new combination. Furthermore, since computer-controlled hardware robots are essentially multi-functional in hardware terms, the duties undertaken by each respective hardware robot generally involve taking on a different role each time the software robot 21 changes (step 109).

Even if one or several of the plurality of hardware robots breaks down during a task, since the seed data 20 selects, and controls, resources (hardware robots) in a desired combination for each task, it is possible to interrupt the task in hand and return to the evaluation and composition function section 1. Thereupon, after checking whether there is a hardware robot available for use which is functioning properly, it is possible to assemble the necessary resources once again and then transfer to the real space. In the real space, it is possible to restart the objective task by operating a plurality of hardware robots which are functioning properly.

As described above, even if there is a breakdown in a hardware robot, provided that an alternative hardware robot exists which is available for use, the whole process will not come to a halt as in conventional systems.

However, if the resources (hardware robots) available for use are reduced by breakdowns and the like, then production efficiency will inevitably decline. If there are spare hardware robots connected to the network, such as unmanned conveyor vehicles housed in a vehicle bay, it is possible to respond to shortages of resources by activating these spare robots.

Whilst the software robot 21 is acting in the real space (step 107), the seed data 20 is constantly rewritten in response to the contents and results of its activity.

In step 102 in the subsequent process, the seed data 20 is evaluated on the basis of the contents rewritten in the previous process, and therefore it is possible to change the form of the minor objective assignment in step 104 in the subsequent process. For example, if data is received to the effect that "In the current process X (door installation process), there was some play in the assembly," then rather than proceeding directly to the next assembly process (window installation process), it is also possible to change to a minor objective which will transfer to processing for "inspecting play in door installation".

By repeating the processing described above, minor objectives are assigned successively to the seed data 20 ("process 1", "process 2", . . . ) and a software robot 21 operates a plurality of hardware robots in accordance with each minor objective (see FIG. 4).

Incidentally, if the virtual space is designated as the activity zone for the next process (verdict at step 105: "virtual space"), then the seed data 20 is transferred to the simulation function section 2 via the communications network 3 (see arrow d in FIG. 3). Accordingly, in the simulation function section 2, the seed data 20, functioning as a software robot 21, conducts virtual activity to accomplish the minor objective in the form of a simulation.

For example, if a task cannot be carried out using the task data currently contained in the seed data 20 in its present state, for instance, if the specifications for the production equipment are changed to suit the hardware robots, then a minor objective is set to the effect of "Change task data (which tasks, are carried out, using which equipment, and when) to correspond to modified production equipment", and a simulation is carried out to achieve this minor objective. The seed data 20 is constantly rewritten in response to the contents and results of this activity in virtual space (step 110). When the simulation for this minor objective is completed (verdict at step 111: "completed"), the software robot 21 which has been active in the virtual space thus far, is then deleted and only the rewritten seed data 20 is returned to the evaluation and composition function section 1 via the communications network 3 (see arrow e in FIG. 3).

Figures 4A, 4B, 4C, 4D:
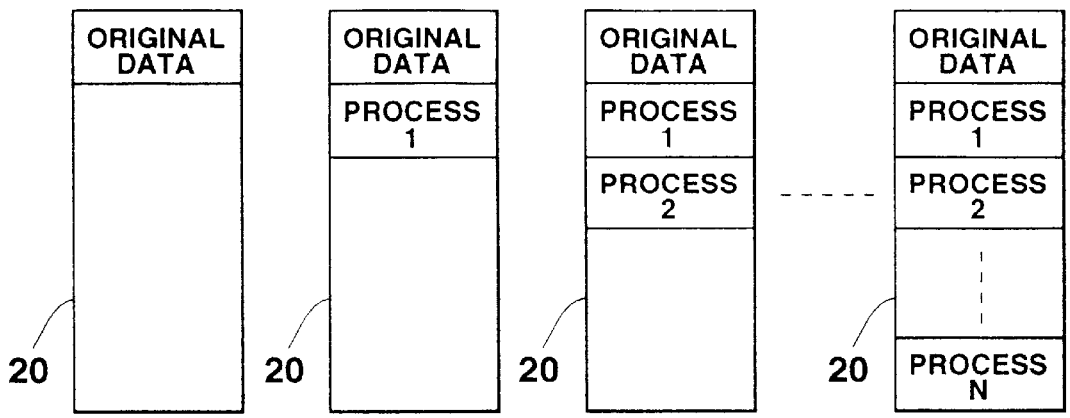
FIGS. 4(a), 4(b), 4(c) and 4(d) are diagrams showing changes in the contents of the seed data.

By repeating the processing described above, in due course the final minor objective ("process N") is accomplished and manufacture of the final product is completed, at which stage the seed data 20 is erased (see FIG. 4(d): step 112).

When the seed data 20 is present in the evaluation and composition function section 1 and is in an "active" state therein, the seed data 20 forms a software robot 21 which controls the evaluation and composition function section 1.

As described previously, according to this mode for implementation, since, when a plurality of hardware robots suited to the minor objective indicated by the seed data 20 have been selected, caused to carry out a task, and have completed the task corresponding to the minor objective, the seed data 20 is withdrawn from the hardware robot(s) which have carried out the task thus far, and these hardware robots become available for tasks based on other seed data 20', it is therefore possible to conduct efficient small-volume, high-diversity production simply by inputting a plurality of seed data 20, 20', . . . (differing specifications for items under manufacture). Moreover, in this case, the only task undertaken by a human operator is that of inputting the seed data 20 relating to the major objective (specifications of finished product), so it is not necessary to program in manufacturing procedures in advance to conform with the production equipment (hardware robots), as in conventional systems. As a result, it is possible to eliminate conventional problems such as complex programming and complicated preparatory tasks, in cases where there is a highly diverse choice of specifications for items under manufacture.

For example, supposing that the evaluation and composition function section 1 into which the seed data 20 is input is a computer located at a business site, the hardware robots are items of production equipment in a factory somewhere in the world, and the communications network 3 is a communications network spanning the entire world, such as the Internet, then simply by connecting the business site and the production site by means of this communications network spanning the entire world, and inputting production orders, production specification lists, and the like, for a desired product (an automobile, for example,) at the business site, it is possible to conduct small-volume high-diversity production automatically and with high efficiency.

Furthermore, unlike conventional systems, production plans can be devised which take the product to be manufactured, rather than the production equipment, as their subject, thereby making it possible to assign the majority of intellectual tasks usually carried out by white-collar workers, for instance, plan scheduling and management scheduling relating to shortening of delivery times, procedural changes, and the like, to computers and robots, and hence producing a dramatic increase in white-collar productivity in the workplace.

Furthermore, even if one or several of the plurality of hardware robots breaks down before or during a task, since the seed data 20 can select the combination of resources (hardware robots) required for the task as desired from the total resources connected to the communications network 3, it is possible for the task to be started or restarted by selecting a combination of hardware robots required for the task after having excluded any hardware robots which have broken down. Therefore, provided that there is a properly functioning hardware robot available for use in place of a hardware robot which has broken down, the whole process will not come to a halt as in conventional systems.

Figure 5:
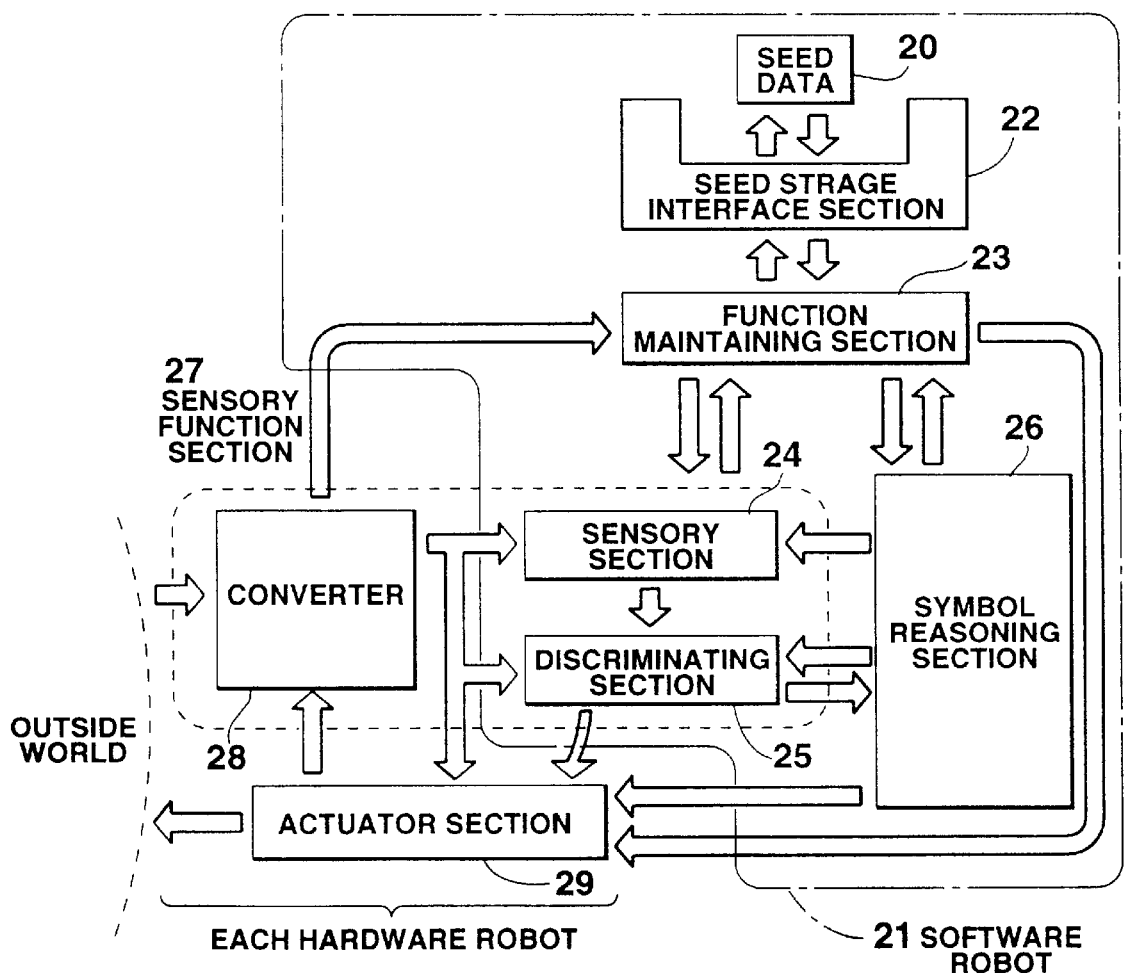
FIG. 5 is a diagram showing the composition of a software robot.

FIG. 5 shows a block diagram of the relationship between hardware robots and a software robot, when the seed data 20 is transferred to real space and acts as a software robot 21 which controls the hardware robots.

In real space, the seed data 20 is transferred as a software robot 21 to at least one hardware robot, for example, in the case of the mobile transplant (B) in FIG. 1, a software robot 21 is generated in the computer in an unmanned conveyor vehicle 7.

Images, sounds, and information relating to distribution, weight and state of gaseous material, liquid material and solid materials in the outside world, in other words, information corresponding to the senses of sight, hearing, smell, taste, and touch in a human being, are fed to each hardware robot by means of the sensory function section 27.

Moreover, each hardware robot is also provided with an actuator section 29 which drives working devices, in other words, items corresponding to limbs or facial muscles in a human being, and the working devices carry out tasks in the outside world and the hardware robots move by operating movement mechanisms, in accordance with this actuator section 29. Moreover, it is also possible to adjust, mechanically or electrically, the measurement parameters, such as the orientation and resolution, of the various sensors attached to the hardware robots, in the same way as changing the orientation, aperture, and focus of a video camera, for example.

The software robot 21 controlling each of these hardware robots is constituted by: a seed storage interface section 22 for reading and writing the seed data 20, a function maintaining section 23, a symbol reasoning section 26, a sensory section 24, and a discriminating section 25. Of these, only the function holding section 23 and the seed storage interface section 22 operate constantly, and the other sections operate according to functional requirements.

The function maintaining section 23 comprises software required for the software robot 21 to maintain the functions of each of the hardware robots, and to exercise continuous control over these. Specifically, a variety of raw data required in order to maintain each hardware robot, such as the remaining power in the battery acting as the hardware robot's power source, the motor current of the production equipment, or the like, is input to the function maintaining section 23 in the form of an output from a converter 28 which functions as a sensor in the sensory function section 27. If conditions which are detrimental to maintenance of the hardware robot functions and the control of the hardware robots by the software robot 21 are detected as a result of this, then the actuator section 29 is operated appropriately, and "unconsciously", so to speak, the working devices or movement mechanisms of the hardware robots are caused to take appropriate action, for instance, the operating conditions or the orientation of the converter 28 may be changed appropriately. Therefore, by changing the output from the converter 28, through a reduction in the overload on the motor, for instance, deliberate operations can be induced by the sensory section 24, discriminating section 25 and symbol reasoning section 26.

It is also possible for the function maintaining section 23 to read out the internal states of the sensory section 24 and discriminating section 25, and to rewrite the operational parameters thereof. Moreover, the function maintaining section 23 conducts processing for reading and writing the contents of the seed data 20 via the seed storing interface section 22. The function maintaining section 23 also conducts processing for rewriting short-term and long-term memories by receiving the results of various reasoning processes from the symbol reasoning section 26. Thereby, a learning effect is displayed, as information for rules in the reasoning processes is changed, knowledge is updated, and coefficients and the like for future use by the symbol reasoning section 26 in reasoning calculations are modified. Conversely, using reports received from the symbol reasoning section 26 and the current work objective as described by the seed data 20, the function maintaining section 23 also conducts processing whereby specific actions, reasoning systems or various data, which are to implemented subsequently, are transferred to the symbol reasoning section 26. Having received this, the symbol reasoning section 26 gathers the information on the outside world it requires to conduct the necessary reasoning, outputs operational commands to the actuator section 29 in order that the required movement or task is carried out, and receives feedback signals from the sensory function section 27, whilst continuing the reasoning process.

Next, the sensory function section 27 is described in more detail with reference to FIG. 6.

Figure 6:
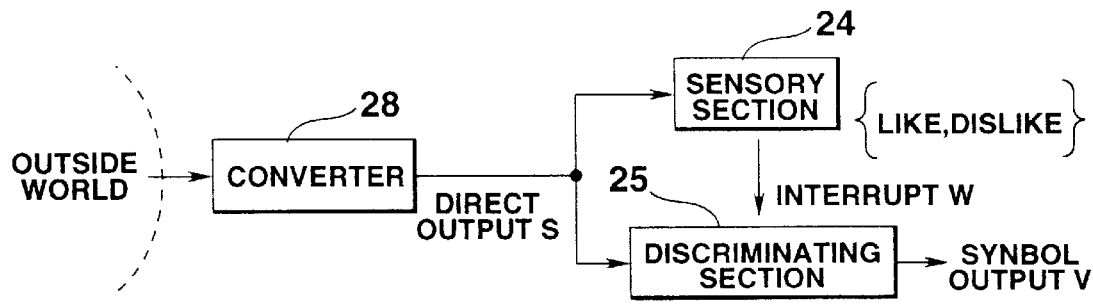
FIG. 6 is a diagram showing the composition of the sensory function section shown in FIG. 5.

Specifically, as shown in FIG. 6, the converter 28 detects changes in the outside world, and converts these changes to electrical signals, for example, which it then outputs. When an electrical signal S directly indicating a change in the outside world is output by the converter 28, it is input to the discriminating section 25, which compares the direct output value S to a reference value, and selects, from a choice of a plurality of concepts (for example, if identifying a color, the choices are concepts such as "red", "green", "yellow", "clear", etc.), a corresponding symbol V (for example, "red"). The direct output S (electrical signal) from the converter 28 is converted to a symbol (concept) by the discriminating section 25 in this way because the direct output S from the converter 28 contains a large volume of information compared to the symbol output V from the discriminating section 25, and although it reflects very slight changes in the outside world, the detailed information contained in this direct output S is not necessarily valuable information.

A conventional non-representational autonomous robot acts using the direct output from the converter 28 in FIG. 6, and a conventional representational autonomous robot acts using the symbol output from the discriminating section 25.

The robots in this mode for implementation act using both direct output and symbol output, as described below.

Specifically, the sensory section 24 which senses "like" and "dislike" with respect to the direct output from the converter 28, by means of fixed references, is provided after the converter 28 and in parallel with the discriminating section 25. The sensory section 24 outputs one of three values: "like", "dislike" and "neutral", and if the output value is "like" or "dislike", a signal to this effect is supplied to the discriminating section 25 in the form of an interrupt signal W.

Next, the relationships between the sensory function section 27 and the surrounding constituent elements are described with reference to FIG. 7 also.

The direct output S from the converter 28 is supplied to the actuator section 29, as well as to the sensory section 24 and the discriminating section 25.

The discriminating section 25 inputs the interrupt signal W output from the sensory section 24, and the direct output S output from the converter 28, and it outputs a symbol output V to the symbol reasoning section 26. A symbol V is only output from the discriminating section 25 after passing through the five internal states described below. Specifically, whereas the direct output S is output constantly by the converter 28, the symbol V is output only after the actuator has been operated and a change of some kind has occurred in the outside world, for the purpose of verification, as described below, and this verification has been completed.

The symbol reasoning section 26 inputs the symbol output V, and outputs an operating command T to the actuator section 29, and furthermore, it outputs signals indicating any changes to the details of a choice to the discriminating section 25.

The specific composition of the symbol reasoning section 26 is not described here, but there exists a large volume of commonly known technical data on various techniques for deriving conclusions from reasoning using events, propositions, or the like, expressed by language or mechanisms, and therefore commonly known techniques of this kind may be applied. Furthermore, a method may also be conceived whereby, rather than narrowly defined reasoning, the symbol output V from the discriminating section 25 is computed in the form of numerical figures, and used as an input for a neural element.

Of the input signals to the actuator section 29, the operational command signal T output from the symbol reasoning section 26 has the highest priority. As long as this operational command T is input, the actuator section 29 will operate in response to the operational command T. However, when this operational command signal T is not supplied, it will obey the operational command U output from the discriminating section 25. Moreover, when neither operational command T or U is output, it operates such that it acts in the outside world on the basis of the direct output S output from the converter 28 acting as a sensor. However, in some cases, when the direct output S output from the converter 28 changes significantly, the actuator section 29 is operated reflexively by means of the direct output S alone, regardless of whether or not outputs T or U from the symbol reasoning section 26 and discriminating section 25 are present.

The actuator section 29, in addition to causing changes in the outside world surrounding it using movement mechanisms and working devices, is also capable of changing the way of detecting changes in the outside world by adjusting the operating method of the converter 28.

In addition to the three principal inputs T, U, S described above, the actuator section 29 also inputs commands output from the function maintaining section 23, which functions in a subconscious manner, whereby the movement mechanisms, working devices and the converter 28 are operated appropriately, and overload on the motor is reduced, as described previously. The commands output from this function maintaining section 23 serve to invoke behavior which is "unconscious and indefinable" in kind, and they comprise operational commands based on concepts represented by symbols, temporary commands such as the operational command U from the discriminating section 25, or continuous commands such as the direct output S from the converter 28. Thus, the actuator section 29 has an input format which is suited to any of the three existing inputs T, U, S (signal in form of symbol, temporary signal, continuous signal) supplied by the function maintaining section 23.

Figure 7:
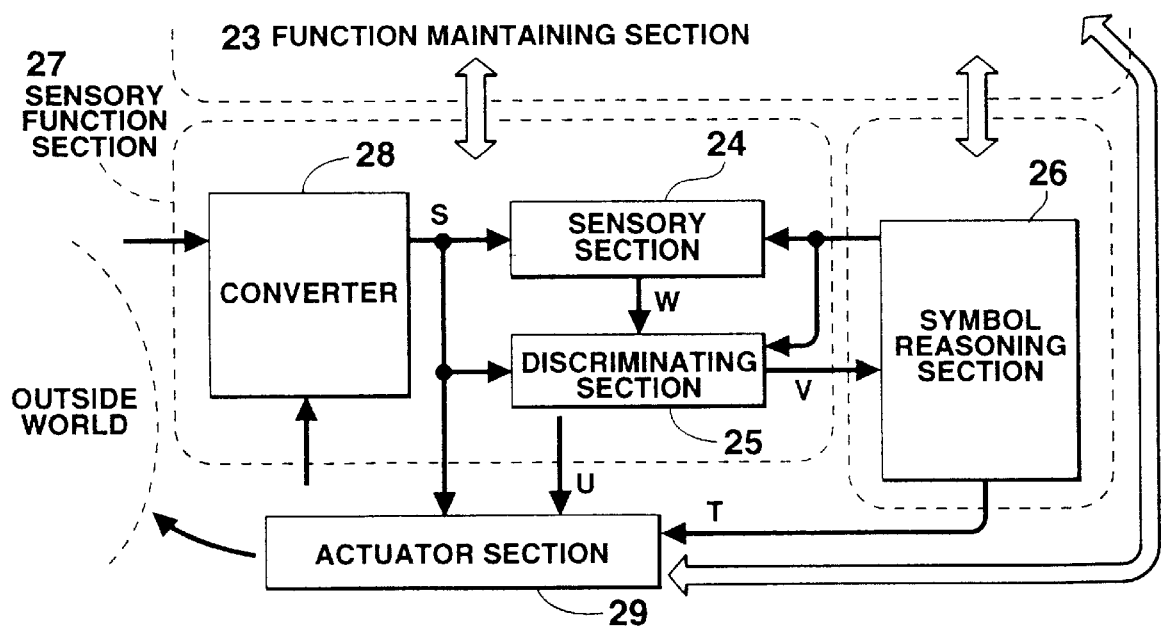
FIG. 7 is a diagram showing a portion of the composition surrounding the sensory function section shown in FIG. 5.

As seen above, the composition illustrated in FIG. 7 contains a signal flow of the form: outside world→converter 28→actuator section 29→outside world. In other words, it comprises the composition of a conventional non-representational autonomous robot wherein the actuator is operated in accordance with direct sensor outputs. In addition, it also contains a signal flow of the form: outside world→converter 28→discriminating section 25→symbol reasoning section 26→actuator section 29→outside world. In other words, it also comprises the composition of a conventional representational robot wherein the actuator is operated in accordance with results deduced on the basis of symbol outputs from a discriminating section.

Figure 8:
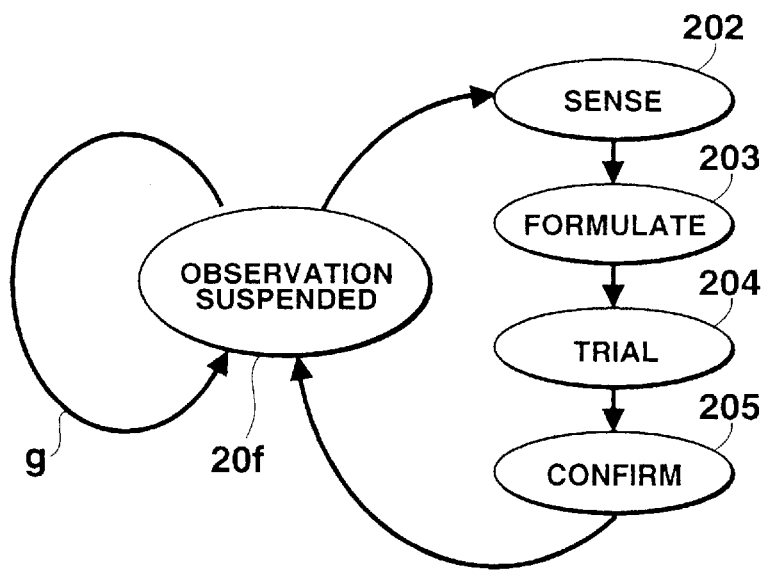
FIG. 8 is a transition chart showing the internal state transitions in the discriminating section shown in FIG. 7 until it outputs a symbol.

Next, a description is given of the procedure followed until a symbol V is output from the discriminating section 25 in the composition in FIG. 7, with additional reference to FIG. 8, which shows the internal state transitions in the discriminating section 25.

Specifically, the appreciation of the outside world by means of the sensory function section 27 is FIG. 7 imitates the process in the human mind when the appearance of the outside world becomes active in the human consciousness, for instance, when a person suddenly notices a change in the outside world.

The direct output S from the converter 28 acting as the sensor alters as the stimulus from the outside world surrounding it changes, even in cases where the robot itself moves and the converter 28 acting as a sensor is manipulated. When, and only when this output is either "like" or "dislike", a series of state transitions (steps 202–205 in FIG. 8) for representing the situation in the outside world by means of a symbol is initiated in the discriminator 25, and when the final state (step 205) in the state transitions is reached, the representational symbol V is finally output.

In the case of humans, the mind does not perceive changes in the outside world, if those changes are regarded as being insignificant or inconsequential. In other words, the change in the outside world is not formulated consciously as a word linked to a concept. This also applies to the composition in FIG. 7, where small changes in the direct output S from the converter 28 are ignored as "irrelevant", and even if there is a change of a certain magnitude, if it is not of the order of the values used in symbol representation, then it is discarded and ignored in the state transition process, and it is not output as a symbol at the final stage. Next, each of the steps in FIG. 8 is described.

Observation Suspended State (Step 201)

In the observation suspended state in FIG. 8, the converter 28 acting as the sensor operates constantly and the direct output S is output continuously, whilst the discriminator 25 assumes an observation suspended state. This observation suspended state refers to a state wherein the discriminator does not output any symbols V or operational commands U, until it receives an interrupt signal W (see arrow g in FIG. 8). In this state, the sensory section 24 detects changes in the outside world as changes in the direct output S, and if it judges a change as one corresponding to "like" or "dislike", then it outputs an interrupt signal W to the discriminating section 25, whereupon the internal state of the discriminator 25 moves from the observation suspended state to the next state, which is the sensory state.

Sensory State (Step 202)

If the content of the interrupt signal input from the sensory section 24 is "dislike", then this indicates the possibility of a problem of some kind befalling the robot in the outside world, and if the content is "like", then this indicates the possibility of a favorable state of some kind for the robot in the outside world. The current direct output S which was judged to be either "like" or "dislike" is read from the converter 28 into the discriminating section 25, which then transfers to the next state, which is the formulating state. At this stage, there is still no output of a symbol V or an operational command U from the discriminating section 25.

Formulating State (Step 203)

In the formulating state, the discriminating section 25 selects, from a plurality of choices, a symbol which is the most appropriate concept for expressing the appearance of the outside world as a first candidate for the symbol output V, on the basis of the "like" or "dislike" interrupt signal W and the direct output S received whilst it was in the sensory state. After making this selection, it then proceeds to the next state, which is the trial state. At this stage, there is still no output of a symbol V or an operational command U from the discriminating section 25.

Trial State (Step 204)

In the trial state, the discriminating section 25 outputs an operational command U to the actuator section 29 in order that it verifies the hypothesis that "the first candidate for symbol output V obtained in the preceding formulating state accurately represents the state of the outside world". Thereupon, it transfers to the next state, which is the confirmation state. There are two types of operational command U which may be supplied to the actuator section 29. The first type are operational commands U which cause the actuator section 29 to change the stimuli from the outside world (the input signal to the converter 28) deliberately, by operating the movement mechanisms or working devices so that the actual state of the outside world surrounding it changes. The other type are operational commands U which cause the actuator section 29 to change only the stimuli received (output signals from the converter 28), without changing the actual state of the outside world surrounding it, by manipulating the converter 28 to adjust its sensitivity, focal point, direction, or the like.

Verification of the aforementioned hypothesis, stating that "the first candidate is correct", involves one of three verification modes, namely, cases where the actuator section 29 moves in a direction which affirms the hypothesis (first candidate), thereby providing positive verification of the hypothesis, cases where the actuator section 29 moves in a direction which disaffirms the hypothesis (first candidate), thereby providing negative verification of the hypothesis, and cases where the actuator section 29 is operated provisionally and the possibility of expressing a different candidate for the symbol output V is examined. At this stage, there is still no output of a symbol V or an operational command U from the discriminating section 25.

Confirmation State (Step 205)

In the confirmation state, the discriminating section 29 reads in the direct output S from the converter 28 produced as a result of the preceding trial state, and it selects, from a plurality of choices, a symbol which is the most appropriate concept for expressing the state of the outside world as a second candidate, on the basis of this direct output S.

If this second candidate is the same as the first candidate symbol selected as a hypothesis in the preceding trial state, then the contents of this first candidate and second candidate are output as symbol V. On the other hand, if the first candidate and second candidate are different, then no symbol V is output at this stage. When this confirmation state is completed, the internal state of the discriminating section 25 is returned to the initial observation suspended state, regardless of whether or not a symbol V has been output.

Here, if the first candidate and the second candidate do not match in the confirmation state, the discriminating section 25 will return to the observation suspended state without outputting any symbol V, even if it encounters a significant environmental change. However, if it is assumed that any significant problem occurring in the environment will produce an increasingly strong stimulus, for instance, if the aforementioned significant environmental change continues to occur, or if the working devices or movement mechanisms of the hardware robot are activated, then this will lead to the sensory section 24 outputting an interrupt signal W to the effect of "like" or "dislike". Thereby, the internal state of the discriminating section 25 is changed to the sensory state, and the series of state transitions is reinitiated. In this case, if the state of the environmental change is stable, then the first candidate and the second candidate for the symbol output V will match in the course of the reinitiated internal state transitions, whereby a symbol output V will be supplied to the symbol reasoning section 26.

Thus, the symbol V output from the discriminating section 25 after passing through the five internal states, observation suspended, sensory, formulating, trial and confirmation, as a result of a change in the outside world, is no more than a very "elementary stage". Namely, it merely represents a stage of perception where changes in the outside world are noticed, for example, in the case of a human being, noticing that "something is ringing" when the office telephone starts to ring. At this stage of perception, complex thoughts such as "Is that a phone ringing?", "Which phone is it?", "Should I answer?" or "I'll leave it someone else because they are near it" do not occur in the subconscious. Logical thought of this kind is conducted by a reasoning process in the symbol reasoning section 26.

However, be that as it may, according to this mode for implementation, rather than converting the direct sensor output into a distinct symbol and implementing action of the basis of this distinct symbol, as in conventional representational autonomous robots, here, a symbol is selected by setting a symbol obtained provisionally as a first candidate, comparing this with a second candidate obtained after operating the actuator in order to verify this first candidate, and achieving a match between the two candidate symbols, and therefore a symbol is selected which accurately represents the state of the outside world. Since action is implemented on the basis of accurate symbols of this kind, it is possible to respond appropriately to the outside world by means of reasoning based on these appropriate symbols, even if unforeseen circumstances are encountered, for example.

In addition, by means of deliberately manipulating the actuator section 29 on the basis of output T from the symbol reasoning section 26, changing the reference value at which the sensory section 24 generates a "like" or "dislike" interrupt signal W, and rewriting the data in the choices for symbol V to be output by the discriminating section 25, it is possible to modify the references for the events or levels which are to be distinguished and achieve deeper environmental perception in response to circumstances in the outside world, even in cases where there is no change in the outside world itself.

Next, a description is given of a dividing method for dividing the constituent elements (functions) of the software robot 21 shown in FIG. 5 amongst a plurality of hardware robots which are spatially separated. This method is applied in the case of divided transplants (C), as shown in FIG. 1.

Dividing the Sensory Function Section 27

In a human being, there are five senses: sight, hearing, smell, taste and touch (including touch by skin, internal organs, and the like). Sight works by means of the human looking at an object with his or her eyes, feeling "like, dislike" and discerning the color, shape, and so on, of the perceived object. Hearing works by the human hearing a sound produced by an object, feeling "like, dislike", and discerning the pitch, volume, and so on, of the perceived object sound. Smell, taste and touch all work similarly, and the concepts that are taken in constantly from the outside world fall into special categories in each of the respective senses.

In view of the above, a sensory section 24 which generates an interrupt W indicating "like" or "dislike", and a discriminating section 25 which generates a symbol output V such as "color", "shape", or the like, need to be provided for each of the sensory categories.

Furthermore, similarly to the manner in which the sensory organs for sight, hearing, and the like, in a human being function as independent sensors, it is possible to provide a plurality of sensory function sections, each containing a set comprising a converter 28 for generating a direct output S indicating the state of the outside world, and a corresponding sensory function section 24 and discriminating section 25, whereby different categories of symbol output V can be generated respectively by this plurality of sensory function sections.

Furthermore, by previously setting a priority order for cases where operational commands are output simultaneously to the actuator section 29, it is possible for the plural categories of sensory function sections to be made to function simultaneously in parallel, such that there is no "conflict" at the actuator section.

The sensory function sections may be divided spatially over a plurality of hardware robots, provided that various restrictions, such as the data volume, transmission speed, and occupied time in communication of information between hardware robots, or between the hardware robots and the communications network 3, so permit.

Dividing the Symbol Reasoning Section 26

The symbol reasoning section 26 is divided up as described below.

As described above, in a virtual entity wherein a plurality of hardware robots form constituent elements like "limbs" and behave autonomously in accordance with a common software robot 21, the symbol reasoning section 26 functions by commanding the elements of the virtual entity as though they were its own limbs.

The symbol reasoning section 26 performs a function which corresponds to the 'subconscious' of the virtual entity. Accordingly, only one symbol reasoning section 26 is required for each virtual entity. If a plurality of such functions were to exist simultaneously in a single virtual entity, with each one functioning independently and supplying operational commands T to the actuator section 29, then there will be a loss of coordination in the deliberate actions of the single entity. However, the symbol reasoning section 26 may be divided spatially over a plurality of hardware robots provided that it functions as a single, interlinked and coordinated unit.

In the event of a breakdown in a hardware robot installed with a computer performing a function of the symbol reasoning section 26, it is beneficial, with a view to easy exchange for an alternative device or spare device, if a further symbol reasoning section 26 is provided as a spare, separately from the original symbol reasoning section 26. In this case, not just one, but several spares may be provided. In order to avoid confusion, it is important that the output T from any spare symbol reasoning section 26 does not affect the system. Furthermore, it is necessary to prepare any spare symbol reasoning section 26 by supplying it with the most recent information, as supplied to the original symbol reasoning section 26, copying the internal states of this original symbol reasoning section 26, and the like, in order that the spare can be activated and brought into use smoothly in the event of a sudden fault in the system.

Dividing the Seed Data 20, Seed Storage Interface Section 22 and Function Maintaining Section 23

The method of dividing the seed data 20, seed storage interface section 22 and function maintaining section 23 follows the method for the symbol reasoning section 26 described above. Since the function maintaining section 23 needs to be able to input directly the signals from the converter 28, which contain maintenance information, and the like, for the hardware robots, and the like, it is desirable for it be divided over a plurality of hardware robots. However, the function maintaining section 23 may be located centrally in a single hardware robot, provided that it is able to input the aforementioned maintenance information, and the like, by means of communication.

Dividing the Actuator Section 29

The actuator section 29 is divided as described below.

The actuator section 29 is the part which causes the "virtual entity" (a plurality of hardware robots controlled by a common software robot, whereby the plurality of hardware robots carry out tasks cooperatively) to act in the outside world. Since the plurality of hardware robots in the virtual entity each respectively have a movement function, working function, or sensor operating function, the actuator section 29 must necessarily by divided across each of the hardware robots.

However, whilst the actuator section 29 has three types of input T, U and S, as described above, there is only one symbol reasoning section 26 which supplies the operational command T indicating the most purposeful action on the basis of results from reasoning processes, and this symbol reasoning section 26 operates as a single coordinated unit, whether its functions are divided over a plurality of hardware robots, or located centrally in a specific hardware robot.

Conversely, the operational commands U output by the discriminating section 25, and the operational commands S based on the direct output from the converter 28, are equal in number to the sensory categories.

Therefore, if the sensory function section 27 and the actuator section 29 performing movement and working functions are located in different hardware robots, it is necessary to exchange information locally between these hardware robots. Namely, as shown in FIG. 9, in addition to the open communications system (shown by thick arrows) operating globally between virtual entities #1, #2, #3, it is also vital to provide exclusive communications networks (shown by thin arrows) providing local communications between the hardware robots 6, 7, 8 within a particular virtual entity (for example, #1).

When a virtual entity consisting of a plurality of hardware robots is observed from the outside, the positional relationships between the hardware robots are not fixed, but rather they generally undergo constant, fluid transformation, as in an amoeba. Naturally, there may be situations where a formation is assembled which involves fixed relative positional relationships between the hardware robots, but these are special cases.

Thus, positional information for the virtual entity which is subject to fluid transformation is supplied to the software robot 21, to the extent that it is required.

Since the symbol reasoning section 26 is the section which causes the virtual entity to act in an integrated and deliberate manner, in order to effect such action, positional information indicating the general positions in the virtual entity is input to the symbol reasoning section 26. Meanwhile, in order to achieve cooperative working between the hardware robots, local positional information indicating the relative position and the like of each hardware robot is input the actuator section 29 divided over the movement mechanisms and working devices of each hardware robot.

What is claimed is:

1. A robot system for carrying out a prescribed task by operating a plurality of hardware robots, comprising:

a computer into which seed data indicating an objective task is input;

a software robot, whereby the plurality of hardware robots are operated in accordance with the objective task, by means of inputting the seed data to at least one hardware robot; and a communications network whereby the computer and the plurality of hardware robots are connected such that communication is possible therebetween, wherein, by communicating with the hardware robots via the communications network, the computer comprises:

selecting means for selecting a plurality of hardware robots which are capable of implementing cooperatively the objective task indicated by the input seed data and which are not engaged in any task based on other seed data;

software robot generating means for creating a software robot comprising the selected plurality of hardware robots, by inputting the seed data to at least one hardware robot of the selected plurality of hardware robots; and withdrawing means for withdrawing the seed data from the hardware robot(s) to which the seed data has been input, when the plurality of hardware robots have been operated by the generated software robot and have completed the objective task.

2. A robot system as described in claim 1, wherein the objective task indicated by the seed data comprises a plurality of minor objective tasks in which the software robot rewrites contents of the seed data in response to task circumstances, whilst the task is being carried out by the plurality of hardware robots, and wherein the computer, by communicating with the hardware robots via the communications network, comprises:

minor objective task setting means for setting a minor objective task in accordance with the objective task indicated by the input seed data;

the selecting means for selecting a plurality of hardware robots which are capable of implementing cooperatively the minor objective task and which are not engaged in any task based on the other seed data;

the software robot generating means for creating the software robot comprising the selected plurality of hardware robots, by inputting the seed data to at least one hardware robot of the selected plurality of hardware robots;

the withdrawing means for withdrawing the seed data from the hardware robots to which the seed data has been input, when the plurality of hardware robots have been operated by the generated software robot and have completed the minor objective task; and means for evaluating the seed data rewritten in response to circumstances of the minor objective task, and repeating respective processing by the minor objective task setting means, the selecting means, the software robot generating means, and the withdrawing means, if it is determined that the objective task indicated by the seed data has not been completed.

3. A robot system as described in claim 2, wherein the objective task indicated by the seed data is a task of manufacturing a desired final product, and the plurality of minor objective tasks are a plurality of processes required in order to manufacture the final product.

4. A robot control device, which is provided with a sensor for detecting a state of an outside world, and symbol selecting means for inputting a detection value from the sensor and selecting, from a plurality of symbols, a symbol representing the state of the outside world in accordance with the sensor detection value, and which conducts reasoning based on the symbol selected by the symbol selecting means and operates an actuator based on a result of the reasoning, the robot control device comprising:

sensor detection value inputting means for inputting the sensor detection value to the symbol selecting means when the sensor detection value has reached a certain reference value, first actuator operating means for taking the symbol selected by the symbol selecting means in accordance with the sensor detection value input by the sensor detection value inputting means and setting it as a first symbol candidate, and operating the actuator to verify that the first symbol candidate represents the state of the outside world;

judging means for inputting the sensor detection value taken after the actuator has been operated by the first actuator operating means to the symbol selecting means, taking the symbol selected by the symbol selecting means in accordance with the input sensor detection value and setting it as a second symbol candidate, and judging whether the second symbol candidate matches with the first symbol candidate; and second actuator operating means which, when the judging means judges that the first symbol candidate and the second symbol candidate match, conducts reasoning based on the matched symbols, and operates the actuator based on the result of the reasoning.

* * * * *